(12) United States Patent
Riegel et al.

(10) Patent No.: US 8,386,850 B2
(45) Date of Patent: Feb. 26, 2013

(54) SYSTEM HEALTH MONITOR

(75) Inventors: Jane Riegel, Marlborough, MA (US);
John Chernoch, Westminister, MA (US)

(73) Assignee: Sepaton, Inc., Marlborough, MA (US)

( * ) Notice: Subject to any disclaimer, the term of this patent is extended or adjusted under 35 U.S.C. 154(b) by 335 days.

(21) Appl. No.: 12/893,955

(22) Filed: Sep. 29, 2010

(65) Prior Publication Data
US 2012/0079326 A1    Mar. 29, 2012

(51) Int. Cl.
*G06F 11/00* (2006.01)
(52) U.S. Cl. .......................................... 714/28
(58) Field of Classification Search ...................... 714/28
See application file for complete search history.

(56) References Cited

U.S. PATENT DOCUMENTS

| | | | | |
|---|---|---|---|---|
| 2006/0235742 | A1* | 10/2006 | Castellanos et al. | 705/10 |
| 2006/0271823 | A1* | 11/2006 | Smith | 714/37 |
| 2007/0245197 | A1* | 10/2007 | Hiraide | 714/741 |
| 2008/0276228 | A1* | 11/2008 | Sreedhar | 717/131 |
| 2011/0264956 | A1* | 10/2011 | Ito et al. | 714/20 |

* cited by examiner

*Primary Examiner* — Bryce Bonzo
(74) *Attorney, Agent, or Firm* — Lando & Anastasi, LLP

(57) ABSTRACT

Backup set metadata is received, wherein the backup set metadata comprises information about backup data sets that are received by a backup storage system that stores the backup data sets. The manner in which the backup data sets flow through a processing flow path of the backup storage system is emulated. One or more processes that process the backup set metadata through an emulated processing flow path are executed, wherein the emulated processing flow path is indicative of the manner in which the backup data sets flow through the processing flow path of the backup storage system when the backup storage system stores the backup data sets. One or more timing statistics are calculated based on the flow of the backup set metadata through the emulated processing flow path.

20 Claims, 10 Drawing Sheets

SYSTEM HEALTH MONITOR

CROSS REFERENCES TO RELATED APPLICATIONS

This application relates to and is assigned to the same entity as the co-pending application entitled "System Health Monitor," U.S. patent application Ser. No. 12/893,950, filed on Sep. 29, 2010, the disclosure of which is hereby incorporated herein by reference in its entirety.

FIELD OF THE INVENTION

The present invention relates generally to computer-based methods and apparatuses, including computer program products, for system health monitoring, including monitoring, analyzing, reporting, and predicting aspects of the system.

BACKGROUND

When developing complex or large-scale systems, the various components of the system are often assigned to different teams within a company (or even across multiple companies). Advantageously, a company can best utilize its resources by allowing each team to focus on a particular aspect of the system. The teams can become "experts" in their respective components, and need not worry about how the other components are implemented. For example, the system can be designed with various interfaces between the system components (e.g., where the interface is applicable at both the software and hardware level). The interfaces allow each system component (e.g., Ethernet card, software component, etc.) to function independently while using the interfaces to communicate with other system components.

However, it is not unusual for a team that designed one component to not know (or understand) how the remaining components function internally. Therefore, while each team may create custom log files or debug tools for their corresponding component, the other teams similarly create separate log files and debug tools specifically intended for use with the remaining components. Due to this disconnect between log files and debug tools, it can be difficult to collate data among the system components. For example, it may be difficult to collate data in the various system log files because they may be created by different components and/or contain different data entries. As a result, it can be difficult to determine the overall health or status of the system.

In many system deployments, it is important for the system to have full access to its available resources (e.g., processors, memory, data storage, etc.). Therefore, any additional processing, such as extraneous software modules, may unnecessarily consume too much of the available system resources. This can cause the system performance to decrease. For example, while it is desirable to execute health monitoring software in deployed systems (e.g., those actually being used by customers), it is often impractical to do so because it causes the system performance to decrease.

SUMMARY OF THE INVENTION

The invention, in one aspect, features a computerized method for system monitoring. The method includes receiving, by an emulating computing device, backup set metadata, wherein the backup set metadata includes information about backup data sets that are received by a backup storage system that stores the backup data sets. The method includes emulating, by the software monitor computing device, the manner in which data within the backup data sets flow through a processing flow path of the backup storage system. Emulating includes executing, by the emulating computing device, one or more processes that process the backup set metadata through an emulated processing flow path, wherein the one or more processes are also implemented in the backup storage system to process the backup data sets through the processing flow path. Emulating includes determining, by the emulating computing device, two or more potential processing states within the emulated processing flow path. Emulating includes determining, by the emulating computing device, a reason code for each backup set metadata entry of the backup set metadata indicative of a reason that the backup set metadata entry is in a processing state of the two or more potential processing states. Emulating includes identifying, by the emulating computing device, a problem with the manner in which the backup set metadata is flowing through the emulated processing flow path based on the reason codes.

In some examples, the method includes determining the reason codes based on one or more factors including at least one of (i) an expected quantity of data at the processing state, (ii) a processing error at the processing state, or (iii) a backup customer's configuration of the backup storage system. The backup set metadata can be processed through the emulated processing flow path, wherein a plurality of backup set metadata entries of the backup set metadata are in a corresponding processing state of the emulated processing flow path before the plurality of backup set metadata entries are completely processed through the emulated processing flow path. The manner in which backup set metadata entries of the backup set metadata are processed through a portion of the emulated processing flow path can be monitored, wherein the emulated processing flow path is indicative of the manner in which backup data sets that correspond to the backup set metadata entries flow through the processing flow path of the backup storage system.

In other examples, the method includes determining a plurality of backup set metadata entries of the backup set metadata are in a processing state of the two or more potential processing states, determining one or more software agents operating on the plurality of backup set metadata entries at the potential processing state, and determining which backup set metadata entries of the plurality of backup set metadata entries are being operated on by each of the one or more software agents. A statistic for each of the one or more backup agents can be determined, wherein the statistic includes at least one of (i) a number of backup set metadata entries of the backup set metadata associated with the backup agent, (ii) a compression statistic for the backup agent, (iii) a deduplication statistic for the backup agent, or (iv) logical data size for the backup agent. The method can include determining a number of backup set metadata entries of backup set metadata associated with a software agent are above a predetermined threshold, and identifying a fault with the number of backup set metadata entries based on a reason code associated with each of the number of backup set metadata entries, wherein the fault is indicative of why the number of backup set metadata entries are being slowly processed at a particular state in the emulated processing flow path.

In some examples, the method includes storing historical data indicative of the manner in which the backup set metadata was processed through the emulated processing flow path, identifying, based on the historical data, one or more growth factors for the emulating computing device, and predicting a future characteristic of the backup storage system based on the one or more growth factors. The historical data can include at least one of (i) one or more client specific settings or (ii) one or more performance metrics of the emulating computing device, wherein the one or more performance metrics are indicative of a performance of the backup storage system. The one or more client specific settings can include an expiration time for one or more backup set metadata entries of the backup set metadata, wherein the expiration time is indicative of an expiration time for a corresponding backup data set stored by the backup storage system, and the one or more performance metrics includes a deduplication performance metric indicative of a success rate for identifying duplicate data in new backup data sets that is already in stored backup data sets such that the duplicate data is not stored by the backup storage system.

The invention, in another aspect, features an apparatus for system monitoring. The apparatus includes an emulating computing device with a processor and memory configured to receive backup set metadata, wherein the backup set metadata includes information about backup data sets that are received by a backup storage system that stores the backup data sets. The emulating computing device is configured to emulate the manner in which data within the backup data sets flow through a processing flow path of the backup storage system. Emulating includes executing one or more processes that process the backup set metadata through an emulated processing flow path, wherein the one or more processes are also implemented in the backup storage system to process the backup data sets through the processing flow path. Emulating includes determining two or more potential processing states within the emulated processing flow path. Emulating includes determining a reason code for each backup set metadata entry of the backup set metadata indicative of reason that the backup set metadata entry is in a processing state of the two or more potential processing states. Emulating includes identifying a problem with the manner in which the backup set metadata is flowing through the emulated processing flow path based on the reason codes.

In some examples, the computing device is further configured to determine the reason codes based on one or more factors including at least one of (i) an expected quantity of data at the processing state, (ii) a processing error at the processing state, or (iii) a backup customer's configuration of the backup storage system. The computing device can be further configured to process the backup set metadata through the emulated processing flow path, wherein a plurality of backup set metadata entries of the backup set metadata are in a corresponding processing state of the emulated processing flow path before the plurality of backup set metadata entries are completely processed through the emulated processing flow path.

In other examples, the computing device is further configured to monitor the manner in which backup set metadata entries of the backup set metadata are processed through a portion of the emulated processing flow path, wherein the emulated processing flow path is indicative of the manner in which backup data sets that correspond to the backup set metadata entries of the backup set metadata flow through the processing flow path of the backup storage system.

In some examples, the computing device is further configured to determine a plurality of backup set metadata entries of backup set metadata are in a processing state of the two or more potential processing states, determine one or more software agents operating on the plurality of backup set metadata entries at the potential processing state, and determine which backup set metadata entries of the plurality of backup set metadata entries are being operated on by each of the one or more software agents. The computing device can be further configured to determine a statistic for each of the one or more software agents, wherein the statistic includes at least one of (i) a number of backup set metadata entries of the backup set metadata associated with the software agent, (ii) a compression statistic for the software agent, or (iii) a deduplication statistic for the software agent. The computing device can be further configured to determine a number of backup set metadata entries of the backup set metadata associated with a software agent are above a predetermined threshold, and identify a fault with the number of backup set metadata entries based on a reason code associated with each of the number of backup set metadata entries, wherein the fault is indicative of why the number of backup set metadata entries are being slowly processed at a particular state in the emulated processing flow path.

In other examples, the computing device is further configured to store historical data indicative of the manner in which the backup set metadata was processed through the emulated processing flow path, identify, based on the historical data, one or more growth factors for the emulating computing device, and predict a future characteristic of the backup storage system based on the one or more growth factors. The future characteristic can include a future expected requirement of storage space to prevent the backup storage system from running out of storage space, a future required number of computer nodes for the backup storage system to support an expected processing requirement of the backup storage system, or any combination thereof.

The invention, in another aspect, features a computer program product, tangibly embodied in a non-transitory computer readable medium. The computer program product includes instructions being operable to cause a data processing apparatus to receive backup set metadata, wherein the backup set metadata includes information about backup data sets that are received by a backup storage system that stores the backup data sets. The computer program product includes instructions being operable to cause a data processing apparatus to emulate the manner in which data within the backup data sets flow through a processing flow path of the backup storage system. Emulating includes executing one or more processes that process the backup set metadata through an emulated processing flow path, wherein the one or more processes are also implemented in the backup storage system to process the backup data sets through the processing flow path. Emulating includes determining two or more potential processing states within the emulated processing flow path. Emulating includes determining a reason code for each backup set metadata entry of the backup set metadata indicative of reason that the backup set metadata entry is in a processing state of the two or more potential processing states. Emulating includes identifying a problem with the manner in which the backup set metadata is flowing through the emulated processing flow path based on the reason codes.

The invention, in another aspect, includes a computerized method for system monitoring. The method includes receiving, by a emulating computing device, backup set metadata, wherein the backup set metadata includes information about backup data sets that are received by a backup storage system that stores the backup data sets. The method includes emulating, by the software monitor computing device, the manner in which the backup data sets flow through a processing flow path of the backup storage system. Emulating includes executing, by the emulating computing device, one or more processes that process the backup set metadata through an emulated processing flow path, wherein the emulated processing flow path is indicative of the manner in which the backup data sets flow through the processing flow path of the backup storage system when the backup storage system stores the backup data sets. Emulating includes calculating, by the emulating computing device, one or more timing statistics based on the flow of the backup set metadata through the emulated processing flow path.

In some examples, the method includes determining two or more potential processing states within the emulated processing flow path, and calculating, for each backup set metadata entry of the backup set metadata that is indicative of a backup data set, a process flow timing statistic indicative of an amount of time the backup set metadata entry took to reach a processing state of the two or more potential processing states within the emulated processing flow path. The method can include storing, for the backup set metadata entry, data indicative of a time when the backup set metadata entry reached each processing state of the two or more potential processing states, and calculating the timing statistic based on the stored data.

In other examples, the method includes calculating, for each backup set metadata entry from the backup set metadata, a process flow timing statistic for each processing state of the two or more potential processing states based on the stored data to generate historical data for the backup set metadata entry. The method can include determining process flow timing statistics for a processing state of the two or more potential processing states are above a predetermined threshold, identifying a software agent operating on the backup set metadata entries of the backup set metadata associated with the process flow timing statistics at the processing state, and generating a fault with the software agent.

In some examples, the method includes calculating a performance timing statistic for the backup set metadata indicative of whether to process a backup data set through one or more steps of the processing flow path in the backup storage system. The method can include calculating the performance timing statistic based on how backup data sets are processed by the backup storage system. The method can include calculating the performance timing statistic based on size information in the backup set metadata, a count of the backup set metadata entries in the backup set metadata, and a performance metric associated with processing the backup set metadata through the one or more steps of the emulated processing flow path. The method can include calculating a performance timing statistic indicative of a minimum required size for a backup data set to make processing the backup data set through a deduplication step of the processing flow path at least one of (i) computationally efficient or (ii) efficient to reduce a storage size of the backup data set by the backup storage system.

In other examples, the method include calculating a default performance timing statistic, monitoring the flow of the backup set metadata through the emulated processing flow path using the default performance timing statistic, and recalculating the default performance timing statistic based on the monitored flow of the backup set metadata. The method can include calculating the default performance timing statistic based on one or more user configured settings of the backup storage system. The method can include setting a default performance metric of the backup storage system based on the recalculated performance timing statistic.

The invention, in another aspect, features an apparatus for system monitoring. The apparatus includes a computing device with a processor and memory configured to receive backup set metadata, wherein the backup set metadata includes information about backup data sets that are received by a backup storage system that stores the backup data sets. The computing device is configured to emulate the manner in which the backup data sets flow through a processing flow path of the backup storage system. Emulating includes execute one or more processes that process the backup set metadata through an emulated processing flow path, wherein the emulated processing flow path is indicative of the manner in which the backup data sets flow through the processing flow path of the backup storage system when the backup storage system stores the backup data sets. Emulating includes calculating one or more timing statistics based on the flow of the backup set metadata through the emulated processing flow path.

In some examples, the computing device is further configured to determine two or more potential processing states within the emulated processing flow path, and calculate, for each backup set metadata entry of the backup set metadata that is indicative of a backup data set, a process flow timing statistic indicative of an amount of time the backup set metadata entry took to reach a processing state of the two or more potential processing states within the emulated processing flow path. The computing device can be configured to store, for the backup set metadata entry, data indicative of a time when the backup set metadata entry reached each processing state of the two or more potential processing states, and calculate the timing statistic based on the stored data. The computing device can be further configured to determine process flow timing statistics for a processing state of the two or more potential processing states are above a predetermined threshold, identify a software agent operating on the backup set metadata entries of the backup set metadata associated with the process flow timing statistics at the processing state to determine, and generate a fault with the software agent.

In other examples, the computing device is further configured to calculate a performance timing statistic for the backup set metadata indicative of whether to process a backup data set through one or more steps of the processing flow path in the backup storage system. A fault can be indicative of a fault with a user configuration of a backup application. The computing device can be further configured to calculate a default performance timing statistic, monitor the flow of the backup set metadata through the emulated processing flow path using the default performance timing statistic, and recalculate the default performance timing statistic based on the monitored flow of the backup set metadata.

The invention, in another aspect, features a computer program product, tangibly embodied in a non-transitory computer readable medium. The computer program product includes instructions being operable to cause a data processing apparatus to receive backup set metadata, wherein the backup set metadata includes information about backup data sets that are received by a backup storage system that stores the backup data sets. The computer program product includes instructions being operable to cause a data processing apparatus to emulate the manner in which the backup data sets flow through a processing flow path of the backup storage system. Emulating includes executing one or more processes that process the backup set metadata through an emulated processing flow path, wherein the emulated processing flow path is indicative of the manner in which the backup data sets flow through the processing flow path of the backup storage system when the backup storage system stores the backup data sets. Emulating includes calculating one or more timing statistics based on the flow of the backup set metadata through the emulated processing flow path.

The techniques, which include both methods and apparatuses, described herein can provide one or more of the following advantages. An emulating computing device can implement the desired functionality of computing device, allowing the health of the emulating computing device to be monitored such that the health of the emulating computing device will directly correlate with the health of the actual computing device. Metadata (e.g., which includes information about data processed by the computing device) is processed by the emulating computing device in the same manner (either identically or partially) such that health monitoring statistics of the emulating computing device are indicative of health statistics of the computing device. The emulating computing device can use the metadata to learn about the different data processed by the computing device, such as the size of the data sets, the type of the data sets, and any other information about the data. Further, the metadata can be processed through an emulated processing flow path and grouped into processing states. The metadata can be assigned reason codes to identify why groups of the metadata are in particular processing states. Thresholds can be intelligently set to identify problems processing the data corresponding to the metadata at a particular processing state. The emulating computing device can detect problems with both the computing device itself as well as how the up environment is configured.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

DETAILED DESCRIPTION

In general, metadata is captured (e.g., stripped off as data comes into the computing device) or calculated based on actual data input into a computing device. The metadata is input into an emulating computing device that correlates the metadata to determine the health of the actual computing device. Therefore, for example, by processing the metadata the emulating computing device can identify problems with how the computing device processes the actual data that is represented by the metadata. The emulating computing device can analyze the system health data to give a broad view of the system's overall status. Further, the emulating computing device can determine how specific aspects of the computing device are performing. Metadata in the emulating computing device can be classified based on processing states within the emulating computing device, correlation of the data, and/or simulation of one or more processes to produce reason codes that define why data is in a particular state of the system. The emulating computing device can identify faults (or potential faults or issues) with the data based on the reason codes associated with the data.

The emulated computing device can analyze the processing data flow of metadata through the emulated computing device to calculate metrics and/or statistics of the processing data flow. The emulating computing device can intelligently determine whether or not certain metadata should not be processed through one or more portions of the processing data flow. The emulating computing device can analyze details of a processing state to determine, for example, a particular software agent's performance at the processing state. Further, the overall computing device system performance can be analyzed over time (e.g., via historical data) to determine how the system is performing over time. The computing device system size can be predicted (e.g., for 6 months or 1 year) based on the historical data (e.g., to determine required storage capacity, number of hardware nodes, system ratios, etc.).

Although the specification and/or figures describe(s) the techniques mostly in terms of backup storage systems, these techniques work equally as well on any other type of system (e.g., hardware and/or software systems), where data being sent to the system can also be sent to an emulating system that executes one or more of the same algorithms (or processes) executed by the system to emulate how the data is processed through the system. For example, the system may be a data protection appliance that provides features for a user to verify that backed-up data is actually on the backup appliance. Similarly, how the data is transmitted to the system can be performed by any known data transfer method (e.g., data is backup based on a network file system (NFS) mount and therefore comes into the system as network attached storage, data is backed-up by a backup appliance, etc.).

Figure 1:
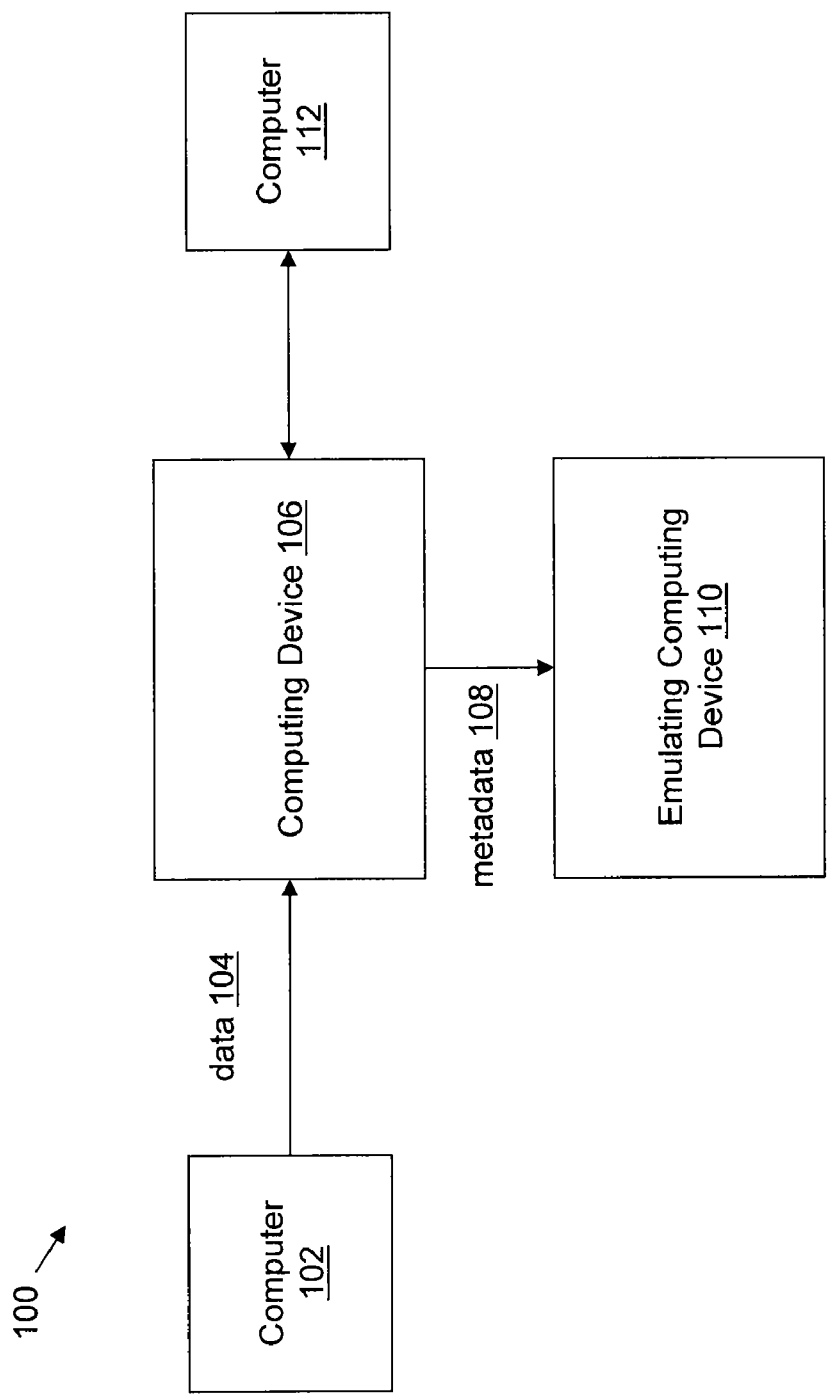
FIG. 1 is a block diagram of an exemplary system for health monitoring according to the present invention.

FIG. 1 is a block diagram of an exemplary system 100 for health monitoring according to the present invention. The system 100 includes a computer 102. The computer 102 transmits data 104 to a computing device 106. The computing device 106 transmits metadata 108 to an emulating computing device 110 (e.g., by an automated script executing on the computing device 106). Metadata 108 comprises information about the data 104. A computer 112 is in communication with computing device 106. In some examples, the metadata 108 is transmitted to the emulating computing device 110 as the data 104 is collected by the computing device 106. In some examples, metadata 108 is post-processed by the emulating computing device 110 (e.g., three months of data are accumulated at the computing device 106 and then transmitted to the emulating computing device 110).

While only one computer 102 is shown in system 100, the system (e.g., a networked computer environment) includes any computing environment in which one or more computers 102 are connected to one or more computing devices 106 and emulating computing devices 110 in such a manner that the computers 102 transmit data 104 to the computing devices 106 and metadata 108 (or portions of the data 104) to the emulating computing device 110. The computers 102 can be any computer that has at least one processor, such as a personal computer (PC), a workstation, a mainframe, a networked client, a server, a media server, an application server, etc. that is capable of communication with other devices, such as a storage system or other node computers.

The computing device 106 can be any type of computing device in which it is desirable to monitor the health of the computing device 106 (e.g., by a user of the computing device 106 or by the company that develops the computing device 106 and/or software being executed by the computing device 106). For example, the computer 102 can use the computing device 106 as a central data store. The computer 102 can execute processes that store data within the computing device 106. The computer 102 can be coupled to the computing device 106 and the emulating computing device 110 via a storage area network (SAN). The computing device 106 can include (or be in communication with), for example, disk arrays such as are available from companies like EMC Corporation, IBM Corporation and others. Alternatively, a bus (not shown) or other network link may provide an interconnect between the computer 102 and the computing device 106. The bus and/or Fibre Channel network connection may operate using a protocol, such as the Small Component System Interconnect (SCSI) protocol, which dictates a format of packets transferred between the computer 102 and the computing device 106.

Fibre Channel is one example of a communication network that may be used with embodiments of the present invention. However, it is to be appreciated that the networks described herein are not limited to Fibre Channel, and that the various network components may communicate with each other over any network connection, such as Token Ring or Ethernet instead of, or in addition to Fibre Channel, or over combinations of different network connections. Fibre Channel is a standard that combines the speed of channel-based transmission schemes and the flexibility of network-based transmission schemes and allows multiple initiators to communicate with multiple targets over a network, where the initiator and the target may be any device coupled to the network. Fibre Channel is typically implemented using a fast transmission media such as optical fiber cables, and is thus a popular choice for storage system networks where large amounts of data are transferred. Moreover, aspects of the present invention may also be used in bus topologies, such as SCSI or parallel SCSI.

According to various embodiments and aspects of the present invention, the computing device 106 is a virtual removable media library backup storage system that may use one or more disk arrays to emulate a removable media based storage system (not shown). Using embodiments of the invention, the computer 102 may backup data onto the computing device 106 using the same backup/restore application as would have been used to backup the data onto removable media (such as tapes, magnetic disks, optical disks, etc.), without a user having to make any modifications or adjustments to the existing backup procedures or having to purchase a new backup/restore application. In one exemplary embodiment, the removable media that are emulated are tapes, and the backup storage system of the invention emulates a tape library system including tapes and the robotic mechanism used to handle tapes in a conventional tape library system.

The data 104 can be any type of data transmitted from the computer 102 to the computing device 106. In some embodiments, for a backup storage system, the data 104 that may be backed-up and restored may be organized into various data objects. These data objects may include any structure into which data may be stored. A non-limiting list of exemplary data objects includes bits, bytes, data files, data blocks, data directories, backup data sets, virtual cartridges, file systems (e.g., network file systems), and logical storage units (e.g., OST).

The emulating computing device is a computing device with at least a processor and a memory. Emulating computing device 110 is configured to emulate the computing device 106 such that the system health of computing device 106 can be monitored without interfering with computing device 106. Because the metadata 108 is sent to the emulating computing device 110, the emulating computing device 110 can process the metadata 108 to emulate how the data 104 is processed by the computing device 106. For example, the various system components (e.g., Fibre Channel cards, disk arrays, switches, etc.), software and/or firmware that make up the computing device 106 can be emulated by the emulating computing device 110. Advantageously, the health of emulating computing device 110 can be monitored, and because the emulating computing device 110 implements the desired functionality of computing device 106, the health of emulating computing device 110 will directly correlate with the health of computing device 106.

The emulating computing device 110 need not emulate all hardware, firmware, or software of the computing device 106. For example, if the health of only certain aspects of the computing device 106 needs to be monitored, the emulating computing device 110 may only implement a subset of the hardware, software and/or firmware of the computing device 106. Additionally, the emulating computing device 110 may implement portions of the computing device 106 in different ways than how the portions are implemented on the computing device 106 (e.g., the emulating computing device 110 may emulate hardware functionality of the computing device 106 via software). For example, if the backup set metadata entries do not include the actual data to be backed up, then the emulating backup storage system 210 cannot actually perform a deduplication comparison with the data. However, the emulating backup storage system 210 can still determine whether or not the deduplication process would be executed by the backup storage system 210 based on the metadata.

Figure 2:
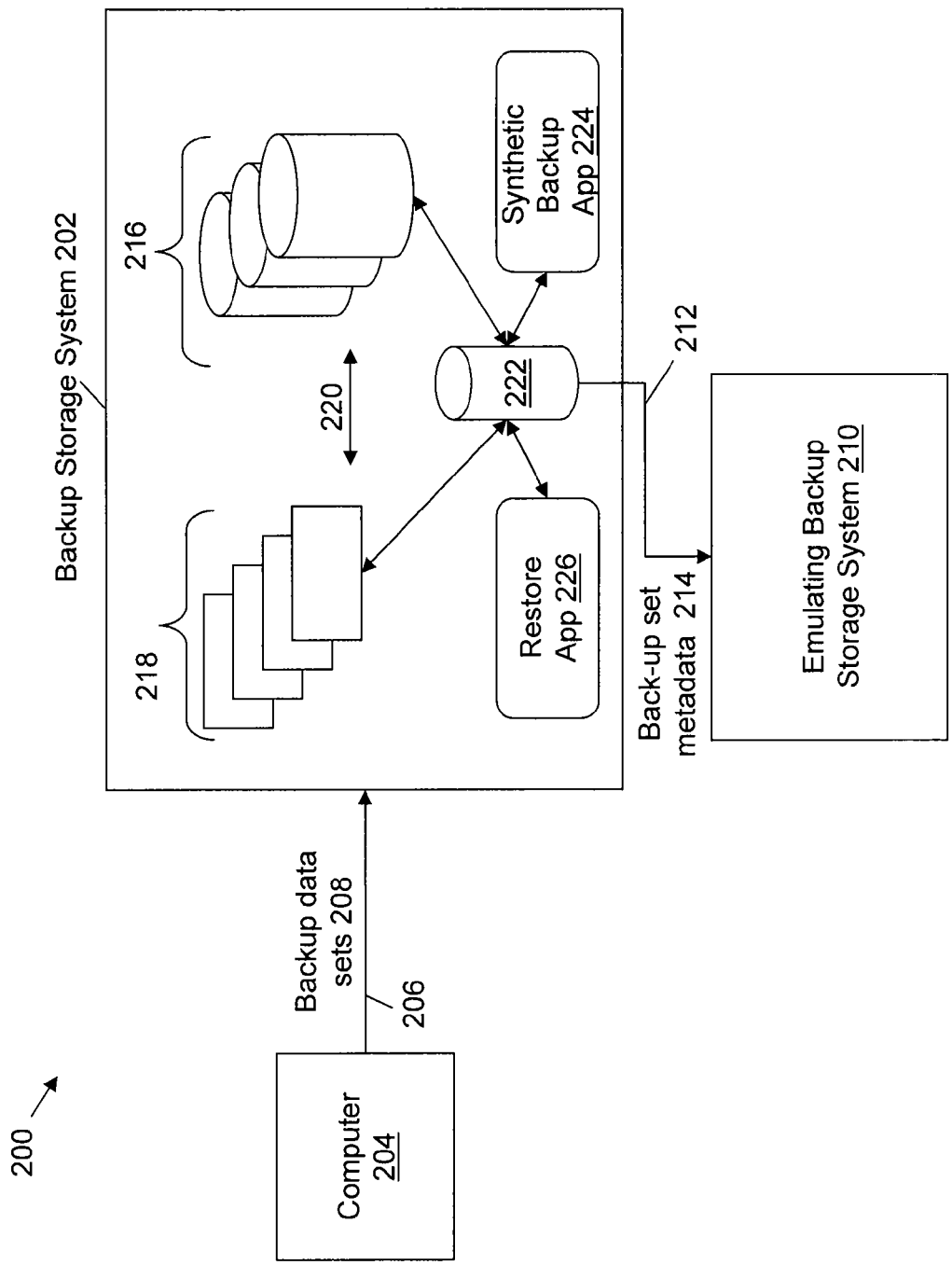
FIG. 2 is a detailed block diagram of an exemplary backup system for health monitoring according to the present invention.

FIG. 2 is a detailed block diagram of an exemplary backup storage system 200 for health monitoring according to the present invention. As illustrated, a computer 204 is coupled to the storage system 202 via a network connection 206, via which the computer 204 transmits backup data sets 208 to the backup storage system 202. The computer 204 and/or the backup storage system 202 are connected to the emulating backup storage system 210 via a second network connection 212, via which the backup storage system 202 transmits the backup set metadata 214 to the emulating backup storage system 210. For example, a customer can initiate sending the data from the backup storage system 202 (e.g., which causes a compressed file with the metadata to be transmitted to the emulated backup storage system 210. In some examples, the backup storage system 202 can include an automated script that automatically transmits the metadata 214 off-site to a remote emulating backup storage system 210. The network connections 206, 212 may be, for example, Fibre Channel connections to allow high-speed transfer of data between the components. It is to be appreciated that the computer 204 may be, or may include, one or more application servers 102 and/or media servers (not shown) and may enable backup of data from either any of the computers present in the networked computing environment or from a primary storage device (not shown). In addition, one or more user computers (e.g., computer 112 in FIG. 1) may also be coupled to the storage system 202 via another network connection (such as an Ethernet connection). The storage system may enable users of the user computers to view and optionally restore backup user files from the storage system.

The storage system 202 includes backup storage media 216 that may be, for example, one or more disk arrays. The backup storage media 216 provide the actual storage space for backup data 208 from the host computer 204. However, the storage system 202 may also include software and additional hardware that emulates a removable media storage system, such as a tape library (file system or logical storage unit), such that, to the backup/restore application running on the computer 204, it appears as though data is being backed-up onto conventional removable storage media. This emulation is separate and distinct from the emulation performed by the emulating backup storage system 210, as is explained further below. Thus, as illustrated in FIG. 2, the storage system 202 may include "emulated media" 218 which represent, for example, virtual or emulated removable storage media such as tapes. These "emulated media" 218 are presented to the host computer 204 by the storage system 202 software and/or hardware and appear to the computer 204 as physical storage media. Further interfacing between the emulated media 218 and the actual backup storage media 226 may be a storage system controller (not shown) and a switching network 220 that accepts the data from the computer 204 and stores the data on the backup storage media 226, as discussed more fully in detail below. In this manner, the storage system "emulates" a conventional tape storage system to the computer 204.

According to one embodiment, the storage system may include a logical metadata cache 222 that stores metadata relating to user data that is backed-up from the computer 204 onto the storage system 202. In some embodiments, the metadata can include data related to the system (e.g., to the backup storage system 202, such as its processing flow path) and how the system is processing the data. For example, the metadata can include data related to software agent scheduling and processing states (e.g., data that gives a snapshot of the processing flow path) and/or software agent log files. As used herein, the term "metadata" refers to data that represents information about user data and describes attributes of actual user data. A non-limiting exemplary list of metadata regarding data objects may include data object size, logical and/or physical location of the data object in primary storage, the creation date of the data object, the date of the last modification of the data object, the backup policy name under which the data objected was stored, name of the host (e.g., backup server) being backed up, an identifier (e.g. a name or watermark) of the data object and the data type of the data object (e.g. a software application associated with the data object). The logical metadata cache 222 represents a searchable collection of data that enables users and/or software applications to randomly locate backup user files, compare user files with one another, and otherwise access and manipulate backup user files. Two examples of software applications that may use the data stored in the logical metadata cache 222 include a synthetic full backup application 224 and an end-user restore application 226. In addition, a de-duplication service may use metadata to provide scalable de-duplication services within a storage system.

The backup set metadata 214 comprises the metadata stored in the logical metadata cache 222. The backup set metadata 214 includes a plurality of backup set metadata entries. For example, the backup set metadata 214 includes, for each backup data set in the backup data sets 208, an entry in the backup set metadata 214. Advantageously, the emulating backup storage system 210 can use the backup set metadata entries to learn about the different backup data sets, such as the size of the data set, the backup type (e.g., whether it was incremental or full), and any other information about the backup data set itself. In some examples, the backup set metadata entries comprise many different characteristics of the backup data sets, but do not include the actual data to be backed up.

As discussed above, the storage system 202 includes hardware and software that interface with the computer 204 and the backup storage media 216. Together, the hardware and software of embodiments of the invention may emulate a conventional tape library backup system such that, from the point of view of the computer 204, data appears to be backed-up onto tape, but is in fact backed-up onto another storage medium, such as, for example, a plurality of disk arrays.

The synthetic full backup application 224 is capable of creating a synthetic full backup data set from one existing full backup data set and one or more incremental backup data sets. The synthetic full backup may obviate the need to perform periodic (e.g., weekly) full backups, thereby saving considerable time and network resources. In one embodiment, the host computer 204 backs-up data 208 onto the emulated media 218, forming one or more virtual cartridges. In some computing environments, a "full backup," (e.g., a backup copy of all data stored on the computer 204 or a primary storage system in the network), may be accomplished periodically (e.g., weekly). This process is typically very lengthy due to the large amount of data that is to be copied. Therefore, in many computing environments, additional backups, termed incremental backups, may be performed between consecutive full backups (e.g., daily). An incremental backup is a process whereby only data that has changed since the last backup was executed (whether incremental or full) is backed-up. Typically, this changed data is backed-up on a file basis, even though frequently much of the data in the file has not changed. Thus, incremental backups are typically much smaller, and therefore much faster to accomplish, than are full backups. According to one embodiment, there is provided a method for creating a synthetic full backup data set from one existing full backup data set and one or more incremental backup data sets (e.g., such that the synthetic full backup data set includes all backup data from the most recent incremental backup data set).

In addition, embodiments may de-duplicate backed-up data to more efficiently utilize available computing resources. According to some embodiments, data de-duplication may be performed in-line (while a data storage system is receiving data to be de-duplicated and stored). In other embodiments, data de-duplication may be performed off-line (after the data storage system has already stored the data to be de-duplicated). The end-user restore application 226 enables end-users (e.g., operators of the user computers 136) to browse, locate, view and/or restore previously backed-up user files from the storage system 202. United States Patent Application Publication No. 2009/0182789 entitled "Scalable De-Duplication Mechanism," filed on Jan. 16, 2009, describes further details of the backup storage system 202, the restore application 226, the synthetic backup application 224, and related features and embodiments, which is incorporated by reference herein in its entirety.

The emulating backup storage system 210 emulates the functionality of the backup storage system 202 as described above. For example, the emulating backup storage system 210 includes software and/or hardware to emulate the backup storage media 216, the emulated media 218, the switching network 220, the metadata cache 222, the synthetic backup application 224 and/or the restore application 226. In a preferred embodiment, the emulating backup storage system 210 emulates a deduplication process of the backup storage system 202. In some embodiments, the emulating backup storage system 210 is included in the backup storage system 202 (e.g., as the backup storage system 202 is actively deployed). Advantageously, the backup set metadata 214 is processed by the emulating backup storage system 210 in the same manner (either identically or partially, however the emulated backup storage system 210 is configured) such that health monitoring statistics of the emulating backup storage system 210 are indicative of statistics of the backup storage system 202.

Figure 3:
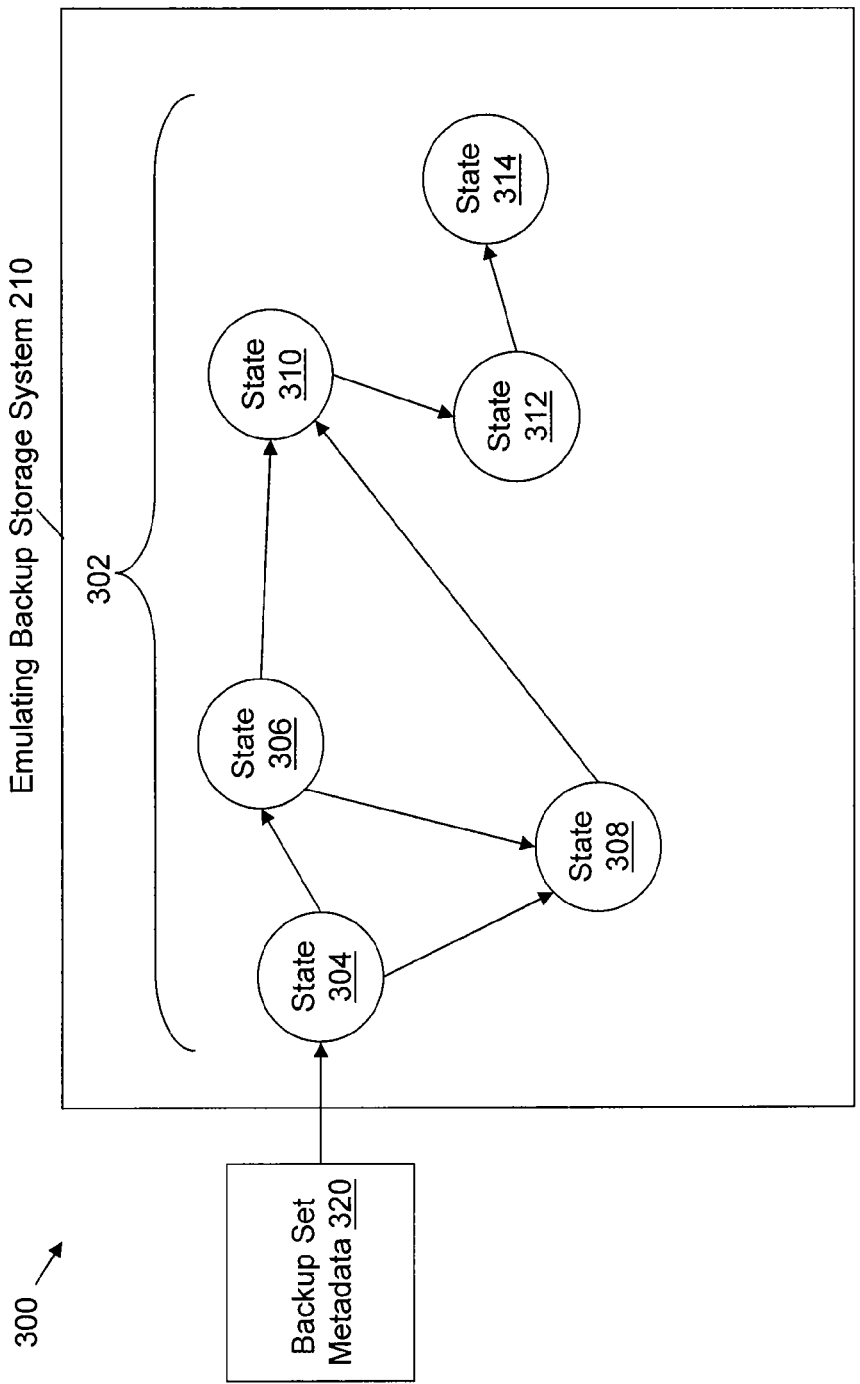
FIG. 3 is a block diagram of an exemplary emulated processing flow path according to the present invention.

FIG. 3 is a block diagram 300 of an exemplary emulated processing flow path 302 of the emulated backup storage system 210 according to the present invention. The emulated processing flow path 302 represents the pipeline of how data flows through the emulated backup storage system 202 as the storage system processes the data. The emulated processing flow path 302 includes potential processing states 304-314 ("processing states"). When the emulated backup storage system 210 receives the backup set metadata 320 (e.g., from computer 204 of FIG. 2), it processes each backup set metadata entry of the backup set metadata through the emulated processing flow path 302. The processing states are potential states because depending on how the storage system 210 processes the metadata, it may only reach a subset of the processing states (e.g., the metadata may go from processing state 304 to processing state 308 and then to processing state 310, skipping state 306 entirely (see, e.g., FIG. 10 and the associated description).

Each processing state represents a grouping of the metadata flowing through the emulated processing flow path 302. For example, if the software executed by the emulated backup storage system 210 includes various components (where each component interacts with the other components via interfaces), each processing state may represent a component. Similarly, if one or more of the components have multiple sub-parts within the component, then each processing state may represent the component sub-parts, the components, or any combination thereof.

The processing states can be represented by numbers, alphanumeric descriptions, or any other marking indicia sufficient to indicate a processing state. For example, the various processing states can be represented by numbers. The backup set metadata entries can be grouped based on the processing state numbers to indicate which backup set metadata entries are in a particular processing state. For example, processing state "0" is representative of backup set metadata entries that are not ready for processing, processing state "100" is representative of backup set metadata entries that are ready for processing by the emulated backup storage system 210, etc.

Referring to FIG. 2, in some embodiments the emulated processing flow path 302 represents the same processing flow path of the backup storage system 202. By monitoring how data flows between the processing states of the emulated backup storage system 210, the health of the backup storage system 202 can be determined. For example, if data is backing up at state 304 in the emulated backup storage system 210, then data is also backing up at the corresponding state in the backup storage system 202. Advantageously, the health information for the emulated backup storage system 210 corresponds to the backup storage system 202. In some embodiments, while there may not be an identical correlation between the storage system 202 and the emulated storage system 210, the correlation is sufficient for health monitoring purposes.

Figure 4:
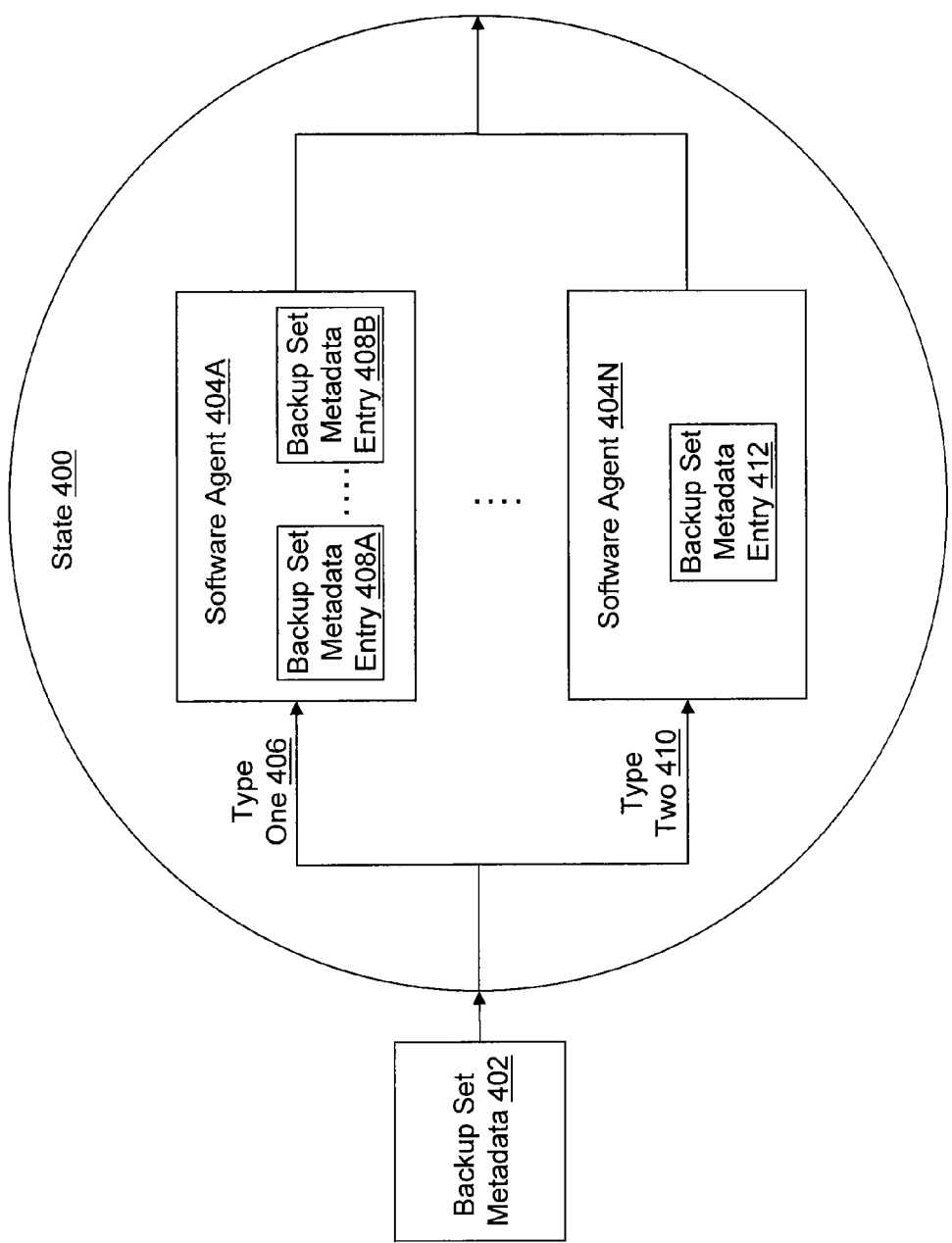
FIG. 4 is a is a block diagram of an exemplary state in an emulated processing flow path according to the present invention.

FIG. 4 is a block diagram of an exemplary processing state 400 in an emulated processing flow path according to the present invention. The processing state 400 includes a plurality of software agents, software agent 404A through software agent 404N, where N is any positive integer (collectively referred to as software agents 404). The backup set metadata 402 enters the state 400 and is processed by the software agents 404. Each software agent 404 can be configured to process a particular type of metadata. For example, software agent 404A processes backup set metadata type one 406. Software agent 404A processes backup set metadata entries 408A and 408B because they are of the type one 406. Software agent 404N processes backup set metadata type two 410, which includes backup set metadata entry 412. While FIG. 4 shows multiple software agents within processing state 400, some states may not have any software agents (e.g., the processing state 400 processes all backup set metadata in the same manner).

The software agents can be, for example, different tasks, threads or separate processes in the backup application being executed by the emulating backup storage system 210. Each of the software agents can be configured to handle a particular type of data. The backup set metadata can include header information (e.g., from the header of the backup data set that the backup set metadata entry corresponds to) that defines various characteristics of the backup data set, such as the type of data, when the data expires (e.g., how long to store the data in the backup storage system before it is no longer required), and other useful information about the backup data set. For example, in backup applications it is typical for backup data to come from various sources, such as from Windows, Network Data Management Protocol (NDMP), Oracle, UNIX, etc. This source information can be included in the backup data set headers. Each of the software agents can be configured to process backup set metadata entries from a different source (e.g., a Windows backup agent can be configured to process Window's data).

Figure 5:
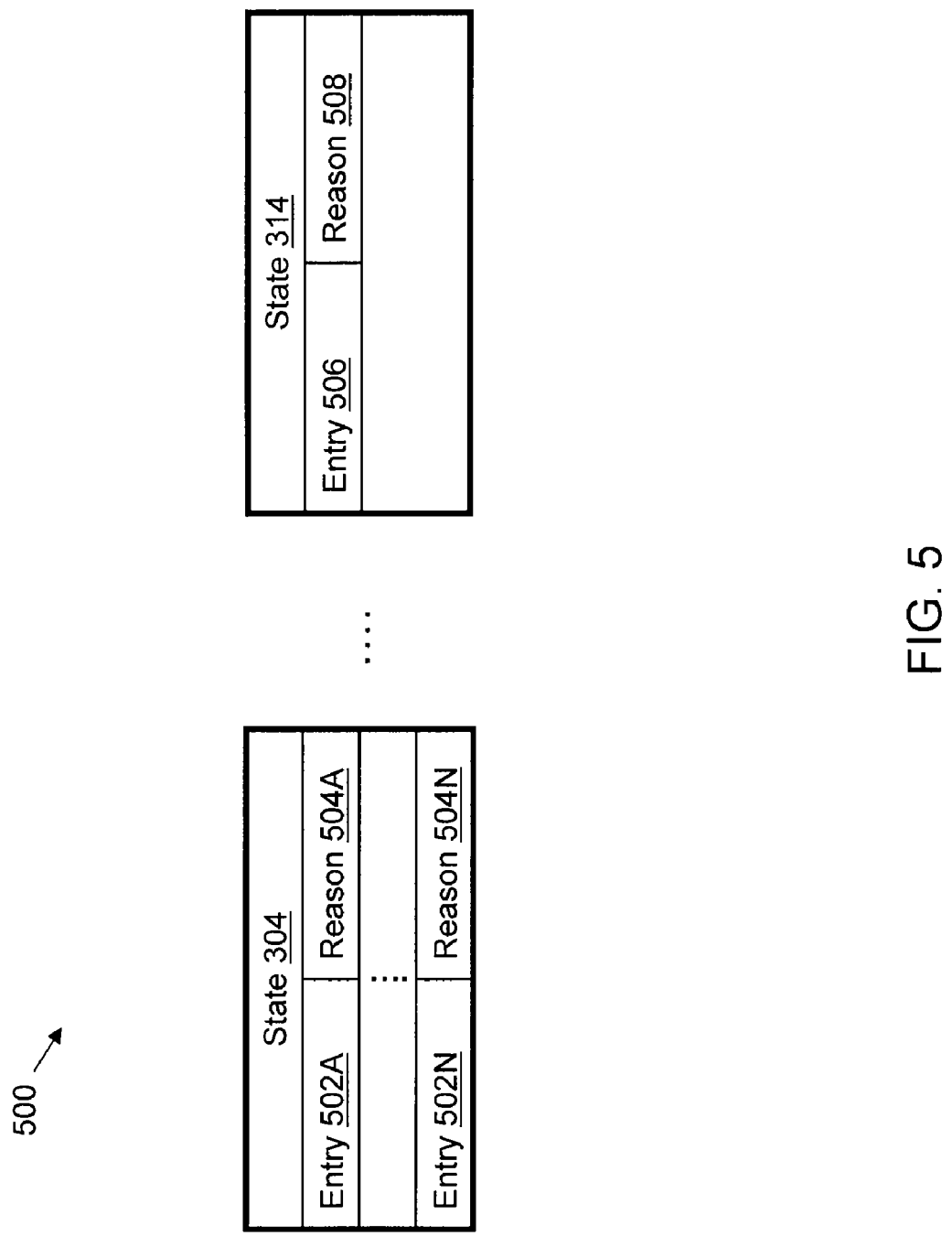
FIG. 5 is a block diagram of reason codes for backup set metadata per processing state according to the present invention.

FIG. 5 is a block diagram 500 of reason codes for backup set metadata entries per processing state of FIG. 3 according to the present invention. Each processing state includes, for each backup set metadata entry within the processing state, a reason code indicative of why the metadata entry is in the processing state. Diagram 500 shows that processing state 304 includes backup set metadata entry 502A through 502N, where N is any positive integer. Each metadata entry in processing state 304 is associated with a reason code; entry 502A is associated with reason code 504A, and entry 502N is associated with reason code 504N. Processing state 314 only includes one metadata entry 506 that is associated with reason code 508. Reason codes can include, for example, that the processing state is just starting to receive data and therefore is waiting for the remaining data before processing the backup set metadata entry (e.g., the backup storage system 202 has not received all of the data for a backup data set), the backup set metadata entry is stuck in the processing state without being completely processed for two days, etc. In some examples, if a specific reason code cannot be assigned to a metadata entry, the emulated backup storage system 210 can assign a generic "unknown" reason code to the metadata entry. The reason codes can be used to predict issues with the storage system 202 based on the reason codes as is described in further detail below with respect to FIGS. 6-7 and the associated descriptions.

For example, if the total number of backup set metadata entries in a processing state is four, then each metadata entry is associated with its own individual reason code. The reason codes can be numbers that are associated with known descriptions, alphanumeric descriptions, or any other type of identifier sufficient to convey a reason the data is in the particular state. For example, three of the four backup set metadata entries can be associated with a reason code "110," which is indicative of ingest still occurring for the backup data set represented by the metadata entries. The remaining metadata entry set can be associated with a reason code "111," which is indicative of an error occurring with the metadata entry (e.g., the system restarted when the processing state was manipulating the data, and now the data is stuck in the processing state).

Figure 6:
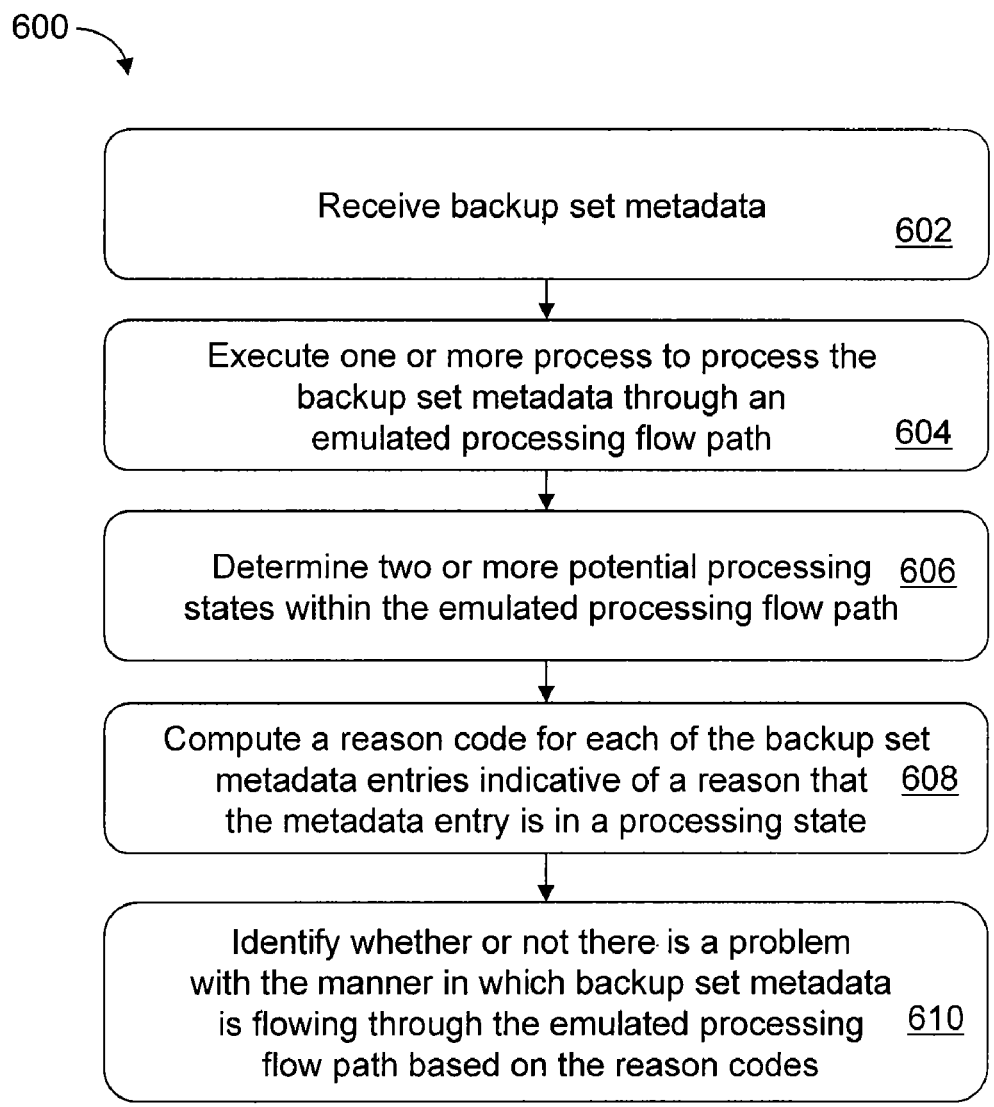
FIG. 6 is an exemplary method for identifying a problem in an emulated processing flow path according to the present invention.

FIG. 6 is an exemplary method 600 for identifying a problem in an emulated processing flow path according to the present invention. Referring to FIGS. 2 and 3, at step 602 the emulated backup storage system 210 receives backup set metadata 214 (e.g., which can also include data related to software agent scheduling and processing stats, and/or software agent log files). The backup set metadata 214 includes metadata (e.g., information) about backup data sets 208 that are received by the backup storage system 202 that stores the backup data sets 208. Referring to steps 604-610, the emulating backup storage system 210 emulates the manner in which data within the backup data sets 208 flow through the processing flow path, or pipeline, of the backup storage system 202. At step 604, the emulating backup storage device 210 executes one or more processes that process the backup set metadata 214 through the emulated processing flow path 302. As described above, in some embodiments the one or more processes are the same one or more processes implemented in the backup storage system 202 (which the backup storage system 202 executes to process the backup data sets 208 through the processing flow path of the backup storage system 202). At step 606, the emulating backup storage system 210 determines two or more potential processing states within the emulated processing flow path. In some examples, the potential processing states are predetermined (e.g., so the emulating backup storage system 210 loads data indicative of the potential processing states from a database). In some examples, an administrator defines the potential processing states for the emulated backup storage system 210. At step 608, the emulating backup storage system 210 determines a reason code for each of the backup set metadata entries of the backup set metadata for whichever processing state the backup set metadata entry is at within the emulated processing flow path. The reason code is indicative of a reason that the backup set metadata entry is in the processing state. At step 610, the emulating backup storage system 210 identifies whether or not there is a problem with the manner in which backup set metadata is flowing through the emulated processing flow path based on the reason codes. In some cases, there are no problems.

Referring to step 604, the emulating backup storage system 210 can monitor the manner in which data within the backup set metadata 214 is processed through a portion (or all) of the emulated processing flow path 302. Advantageously, the emulated processing flow path 302 is indicative of the manner in which data within backup data sets 208 flow through the processing flow path of the backup storage system 202. Therefore, by monitoring the health of the emulated processing flow path 302, the emulating backup storage system 210 can also determine the health of the backup storage system 202.

Referring to step 606, there can be many different backup set metadata entries in various processing states of the emulated processing flow path. For example, at any given time there may be backup set metadata entries being processed concurrently by each of the processing states. Therefore, a plurality of backup set metadata entries can be in different processing states of the emulated processing flow path before the backup set metadata entries are completely processed through the emulated processing flow path. The health of the emulating backup storage system 210 can be calculated by taking into consideration the expectation that backup set metadata entries will be spread across the various processing states.

Referring to step 608, the reason codes can be determined based on a number of factors related to the emulating backup storage system 210. For example, the reason codes can be determined based on an expected quantity of data at the processing state, a processing error at the processing state, or a backup customer's configuration of the backup storage system.

As an example, the emulating backup storage system 210 can calculate a quantity of data (or number of backup set metadata entries) at a particular processing state. Depending on the characteristics of the processing state (e.g., an expected amount of data at the processing state, an expected duration of time each backup set metadata entry is at the processing state, etc.) the quantity of data may or may not be indicative of a problem (or fault) in the emulated processing flow path. For example, a large amount of data may be expected at a processing state if it is a very computationally expensive state (e.g., the processing state uses a lot of processor and/or memory resources to process the data). Therefore, a threshold indicative of an appropriate quantity of data can be calculated individually for each processing state, since each processing state may be different (e.g., rather than merely setting the same threshold across all of the processing states).

For example, if processing state 304 is configured to search for matching data in a deduplication process, then the emulating backup storage system 210 is operating properly even if there is a large quantity of data (or number of metadata entries) at processing state 304. Advantageously, the threshold used to determine whether the quantity of data at processing state 304 is of concern is set appropriately. In some embodiments, the threshold is indicative of a percentage of data in the emulating backup storage system 210. The threshold can be configured based on best practices implemented in the emulating backup storage system 210 (e.g., if a backup data set is too small to warrant executing the deduplication process in the backup storage system 202). The threshold can be based on individual customer configurations (e.g., the configured size of backup data sets for the backup storage system 202, how long backup data sets reside after storage before expiration in the backup storage system 202, etc.). Therefore, the thresholds used to calculate faults in the processing states may vary from customer to customer.

Figure 7:
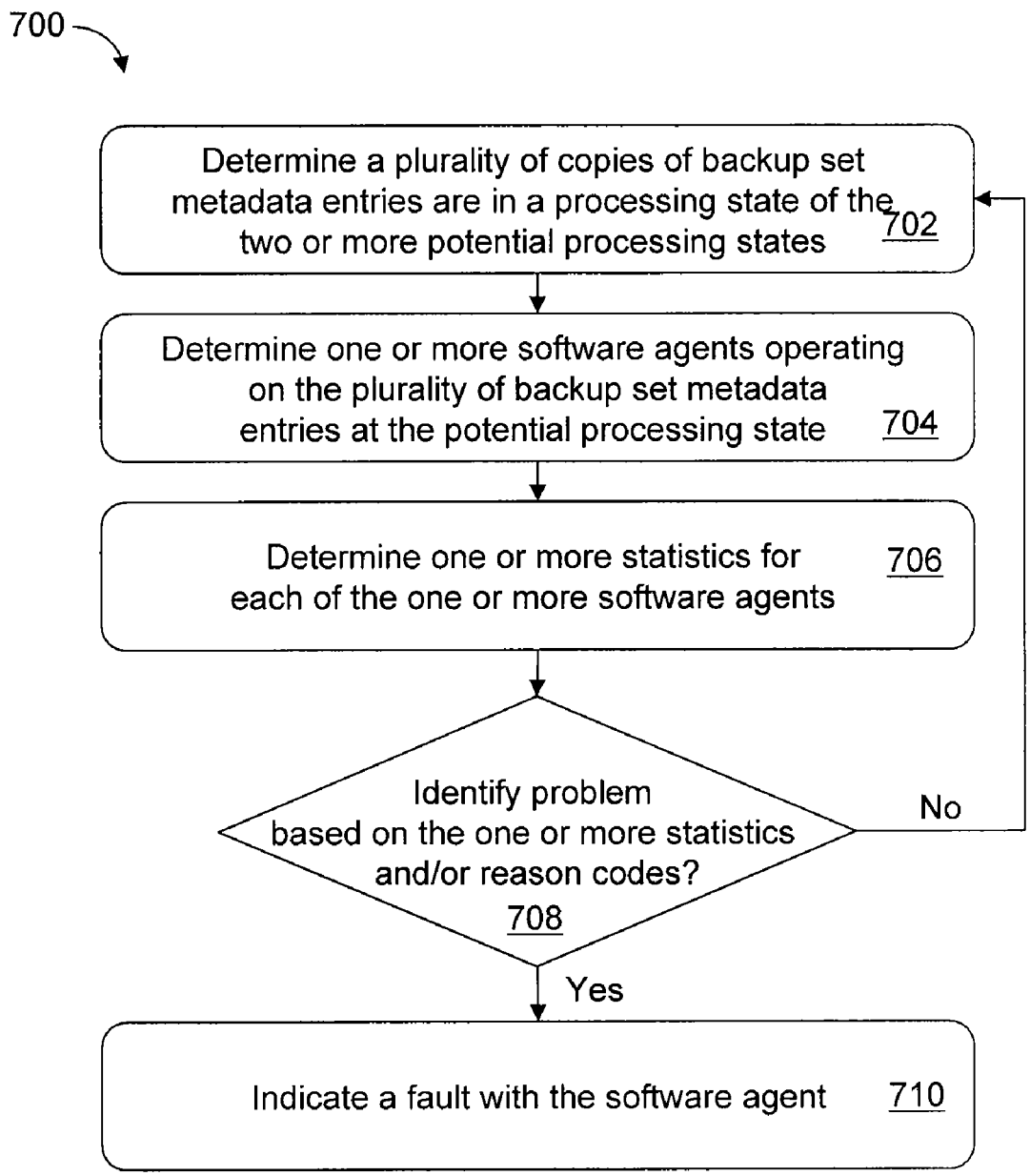
FIG. 7 is an exemplary method for determining the performance of a software agent in an emulated processing flow path according to the present invention.

FIG. 7 is an exemplary method 700 for determining the performance of a software agent in an emulated processing flow path according to the present invention. Referring to FIGS. 2 and 4, at step 702 the emulating backup storage system 210 determines a plurality of backup set metadata entries are in a processing state of the potential processing states (e.g., that there are multiple backup set metadata entries in state 304). At step 704, the emulating backup storage system 210 determines one or more software agents 404 that are operating on the backup set metadata entries at the potential processing state. At step 706, the emulating backup storage system 210 computes (e.g., determines) one or more statistics for each of the software agents 404 (or for backup agents in the backup application being executed by the customer). At step 708, the emulating backup storage system 210 determines whether there is a problem with any of the software agents 404 based on the one or more statistics and/or the reason codes associated with each of the backup set metadata entries. If there are no identified problems, the method 700 proceeds back up to step 702. If the emulating backup storage system 210 identifies one or more identified, then the emulating backup storage system 210 indicates a fault with the software agent.

The fault can be indicative of a problem not with how the software agent is executing, but with how the software agent was configured (e.g., by a user). For example, if a user did not follow the recommended best practices when configuring a software agent, then the software agent may be performing properly based on its configuration. However, because the software agent's configuration goes against best practices, then the software agent will be associated with a fault because it is not operating appropriately for the backup storage system 202. For example, the fault can be used to identify problems outside of the backup storage system 202, such as problems in the backup environment (e.g., how the data is transmitted to the backup storage system 202). Advantageously, by monitoring the software agents, the emulating backup storage system 210 can detect problems with how the backup environment is configured.

Referring to step 706, the one or more statistics can include calculating which metadata entries at the processing state are being operated on by the backup agents (e.g., of the backup application being executed by the customer). For example, the emulating backup storage system 210 can determine which backup set metadata entries are being operated on by each of the backup agents. The statistics can also be based on the particular functionality of the backup agent. For example, if the backup agent performs data compression, then the one or more statistics can include a compression statistic for the backup agent that is indicative of properties of the compression process (e.g., that is indicative of how well the compression operations are performing, how long the compression operations are taking to complete, etc.). Similarly, if the backup agent performs data deduplication, then the one or more statistics can include a deduplication statistic for the backup agent that is indicative of properties of the deduplication process. The statistic can also include, for example, a logical data size for the backup agent. In some examples, the emulating backup storage system 210 calculates the statistics per backup server (e.g., per host), backup policy, backup type (e.g., incremental backup or full backup), and/or based on which deduplication algorithm is used.

For example, the metadata entries can include information that indicates which backup applications and/or which backup agents data is coming from. When the fault with the software agent is generated, the fault can be indicative of which backup application the fault is associated with. For example, a Symantec NetBackup (a backup application) using an Oracle Agent to transmit Oracle data (a backup agent) to the backup storage system 202 may be operating within its configured thresholds, while the same backup application backing up SQL data (a different backup agent) to the backup storage system 202 may be associated with a fault. In some examples, the statistics can include rates of change of the backup storage system 202 over time. For example, the metadata can include information indicative of what type of backup the data is (e.g., a full or incremental backup). The backup type can be compared over time to determine average rates of change of the backup storage system 202. For example, a rate of change per week day can be computed (e.g., the amount of data transmitted to the backup storage system 202 often increases by 10% from Monday to Tuesday). In some examples, peaks can be identified (e.g., the amount of backup data transmitted to the storage system 202 peaks on Friday as everyone prepares for the weekend). Such trends can be analyzed from week-to-week to identify patterns of use.

Referring to step 708, the identification can be based on the one or more statistics and/or the one or more reason codes. For example, the emulating backup storage system 210 may identify a problem because the number of backup set metadata entries associated with a software agent is above a predetermined threshold (or are much greater than those associated with other software agents in the same processing state). In some examples, the emulating backup storage system 210 can identify a problem with a software agent based on a reason code associated with each of the metadata entries the software agent is processing. For example, if a large percentage of the number of metadata entries being processed by a particular software agent all have a reason code indicative of a problem, then the reason codes can be used to diagnose the cause of the problem (e.g., and can be conveyed with the fault). Advantageously, the fault can be indicative of the problem at the particular software agent 404 (e.g., why the number of backup set metadata entries are being slowly processed at a particular state in the emulated processing flow path).

The reason codes can be used to determine whether there is a problem or not. For example, if the emulating backup storage system 210 determines the quantity of data associated with a software agent 404 is above a predetermined threshold, then the reason codes can be used to determine whether or not there is an actual problem with the software agent 404. For example, the reason code may be indicative of the customer or client (e.g., computer 204) using more data than usual. Therefore, the reason codes may indicate that because the customer is using more data than expected (and therefore more data is going to a particular agent or state), then the data quantity threshold for the software agent 404 can be increased to accommodate for the additional data. Or, for example, the reason code may be indicative of poor performance metrics of the software agent (e.g., poor processing characteristics, failure to complete processing the data, etc.). The emulating backup storage system 210 can use these reason codes to identify the problem with the excess quantity of the data. For example, if all of the processing state, software agent, and metric/statistic information is displayed in a graphical form (e.g., a table or bar graph), then the entries associated with the faulty processing state or software agent can be highlighted a particular color or labeled to indicate the fault. Or, the reason code can be indicative of architectural issues of the emulated backup storage system 210 (e.g., waiting for data, data being queued before processing, etc.).

For example, as described above, the software agents 404 can be configured to process different types of backup set metadata entries (and therefore in the sets). The emulating backup storage system 210 can monitor the quantity of metadata entries that are backed up at each of the particular software agents 404 in the processing state. The emulating backup storage system 210 can be configured to have specific thresholds set for each software agent 404. For example, if one type of backup data set is more common than the remaining types of backup data sets received by the backup storage system 202, then a threshold that is used to determine the expected quantity of backup set metadata entries (which are representative of the common backup data set) can be set to a higher level for the agent that processes the metadata entries that are representative of the common type of backup data set than the thresholds used for the remaining software agents. Similarly, other characteristics of the software agents can be taken into account, such as the expected performance of the software agent 404. For example, if a software agent is configured to execute a deduplication process on Windows data, an expected deduplication ratio can be configured for the Windows agent based on characteristics of the Windows data and the software agent (e.g., based on historical deduplication statistics for the software agent). Similarly, if a software agent is configured to execute a deduplication process on SQL data, a different expected deduplication ratio can be configured for the agent.

In some examples, the software agents 404 are executed at multiple processing states. The emulating backup storage system 210. The emulating backup storage system 210 can calculate health data for the software agents 404 across its associated processing states. The health data (statistics and/or characteristics) can include, for example, the number of backup set metadata entries associated with the software agent at each state, the size of the backup set metadata entries at each state (e.g., individual sizes of the data sets represented by the metadata entries, total size of the data sets represented by the metadata, total size of the data sets represented by the metadata compared to the size of all data sets represented by the metadata at the state, etc.), and performance characteristics for the software agent at each state (e.g., deduplication ratios, execution time, execution speed, etc.).

Advantageously, the emulating backup storage system 210 can analyze information about the emulated processing flow path 302 from a high level first to see if any of the stored metrics are indicative of potential problems with the emulated processing flow path 302. If the emulating backup storage system 210 identifies one or more potential problems, the emulating backup storage system 210 can further analyze in detail the other stored metrics to detect faults (or system health issues). The emulating backup storage system 210 can also incorporate the information stored in the metadata that includes data from the backup data set header into the potential problem analysis (e.g., which backup application generated the data set, when the backup data set was created, when the backup data set expires, etc.) to determine whether or not to trigger a fault (or whether to take some other action, such as reconfiguring the monitoring parameters, such as thresholds, within the emulating backup storage system 210). Advantageously, rather than looking at just high-level performance metrics (e.g., the number of data packets received by the backup storage system 202), the emulating backup storage system 210 facilitates analysis of detailed, low-level information to determine low-level characteristics of the emulated processing flow path 302 (e.g., why a backup set metadata entry is stuck in a particular state in the emulated processing flow path 302). For example, rather than analyzing the emulating backup storage system 210 at a system level, the emulating backup storage system 210 is configured to facilitate analysis of why a particular aspect of the software is stopped in the emulated processing data flow (software pipeline).

Figure 8:
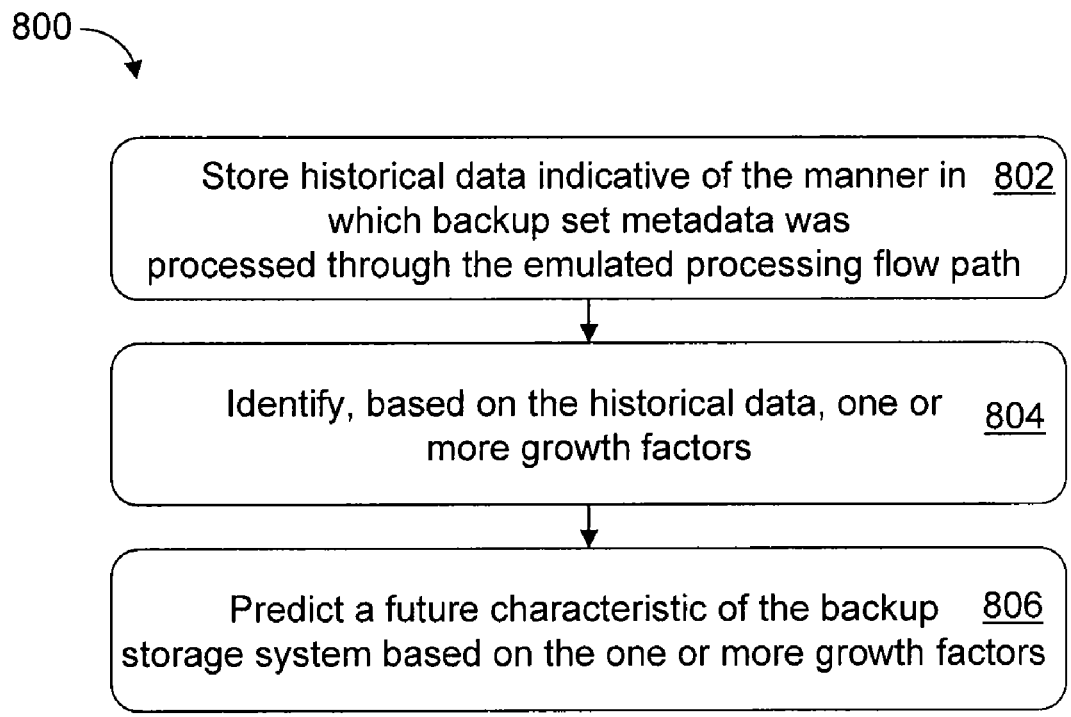
FIG. 8 is an exemplary method for predicting a future characteristic of an emulated system according to the present invention.

FIG. 8 is an exemplary method 800 for predicting a future characteristic of an emulated system according to the present invention. Referring to FIG. 2, at step 802 the emulating backup storage system 210 stores historical data indicative of the manner in which backup set metadata 214 was processed through the emulated processing flow path. At step 804, the emulating backup storage system 210 identifies, based on the historical data, one or more growth factors for the emulating backup storage system 210. At step 806, the emulating backup storage system 210 predicts a future characteristic of the backup storage system 202 based on the one or more growth factors.

Referring to step 802, the historical data can include various performance statistics (or metrics) that are indicative of performance aspects of the emulating backup storage system 210. For example, the historical data can include the number of backup metadata entries processed through the emulating backup storage system 210 (e.g., per day, per week, per processing state, per software agent, etc.). The historical data can include processing characteristics of the emulating backup storage system 210 (e.g., how long data is held up by a processing state, how long a software agent takes to execute, the physical footprint of the backup data sets on the backup storage media 216, performance metrics for how well the emulating backup storage system 210 deduplicates data, performance metrics for how well the emulating backup storage system 210 compresses data, etc.). For example, the historical data can include a deduplication performance metric that is indicative of a success rate for identifying duplicate data in new backup data sets that is already in stored backup data sets (e.g., in the backup storage media 216) such that the duplicate data is not stored by the backup storage system 202 (e.g., the new backup data set is stored with a pointer to the duplicate data already stored in the backup storage media 216).

The historical data can also include data that is specific to the clients using the backup storage system 202 (client specific settings). For example, clients can configure the size of the backup data sets, an expiration time for one or more of the backup data sets stored by the backup storage system 202, how often to backup data, etc. Historical data can be gleaned from the backup set metadata (e.g., from the backup data set headers) and stored for use by the emulating backup storage system 210 to predict future characteristics of the backup storage system 202.

Referring to step 804, the one or more historical growth factors are identified based on the historical data (e.g., client specific settings, performance metrics, etc.). Referring to step 806, the future characteristic is a predicted requirement of the backup storage system 202 to satisfy expected future demands of the system. For example, the future characteristic can be an expected requirement of storage space to prevent the backup storage system from running out of storage space. For example, the future characteristic may be that the backup storage system 202 is expected to require double the storage space than that which it presently includes. The prediction can be for any predetermined time in the future (e.g., six months, one year, three years, five years, etc.). As another example, the future characteristic can be an expected number of computer nodes for the backup storage system to adequately support an expected processing requirement of the backup storage system (e.g., that in six months the backup storage system 202 will require two nodes instead of one to support the expected load for the backup storage system 202).

The historical data allows the emulating backup storage system 210 to take into consideration more than just the expected future loads of the backup storage system 210 to predict future characteristics of the backup storage system 202. The future characteristics include, for example, the additional system components required at a future time to adequately handle the load from computer 204, such as the required storage capacity, number of hardware nodes, and other information that is helpful to gauge the future requirements necessary for the backup storage system 210. For example, the emulating backup storage system 210 can determine that a particular client backs up X amount of data, but that X amount of data is not completely indicative of the storage requirements required for the backup storage system 202 (and therefore those required by backup storage system 202). For example, the storage requirements of the backup storage system 202 may be less than expected because the client configures the data sets to expire in 30 days (or 6 months, etc.), and/or because deduplication performance is good for the data sets then the actual data stored in the backup storage media 216 is less than the size of the actual backup data sets. Therefore, the emulating backup storage system 210 can predict the future requirements of the backup storage system 202 based not only on the amount of data received in the backup data sets (e.g., as indicated by the backup set metadata), but also the processing metrics of the emulating backup storage system 210 and/or the user-configured settings for the backup storage system 202.

Figure 9:
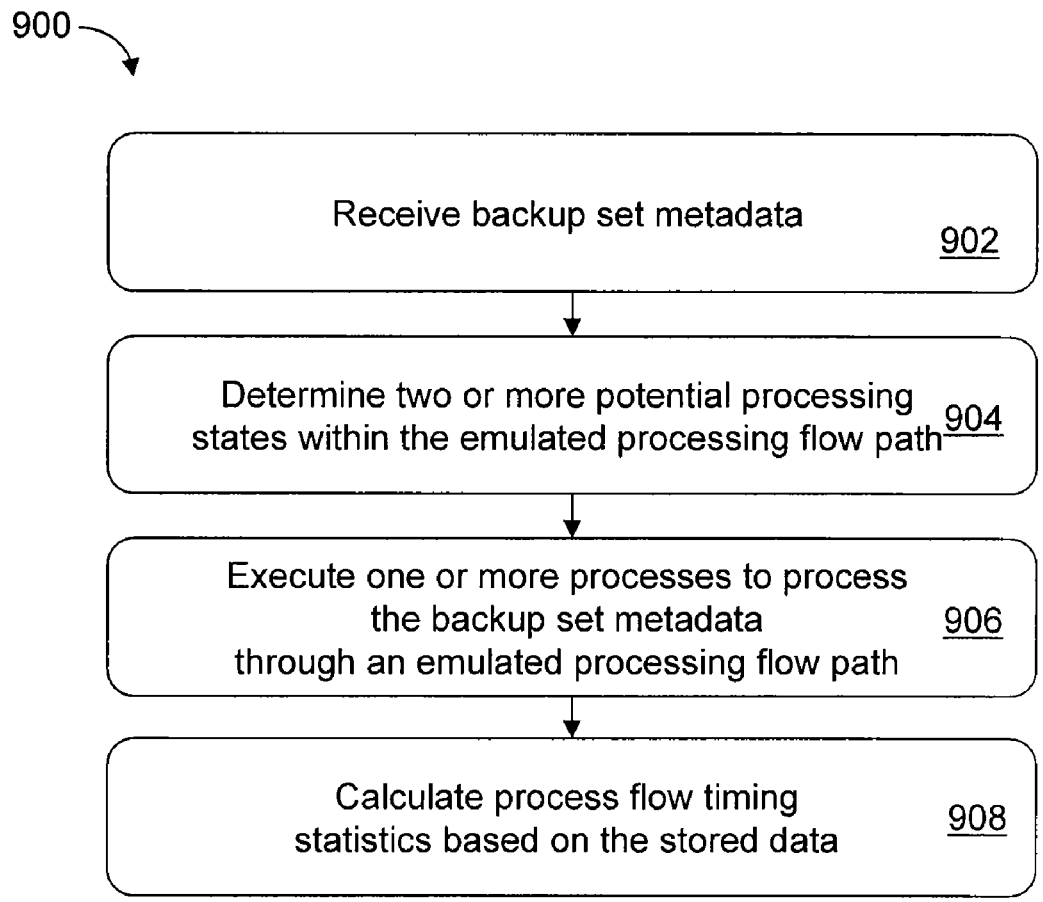
FIG. 9 is an exemplary method for calculating process flow timing statistics according to the present invention.

FIG. 9 is an exemplary method 900 for calculating process flow timing statistics according to the present invention. Referring to FIG. 3, at step 902 the emulating backup storage system 210 receives backup set metadata 320. Referring to steps 904-910, the emulating backup storage system 210 emulates the manner in which the backup data sets flow through a processing flow path of the backup storage system 202 (using the backup set metadata). At step 904, the emulating backup storage system 210 determines two or more potential processing states within the emulated processing flow path 302. At step 906, the emulating backup storage system 210 executes one or more processes that process the backup set metadata 320 through the emulated processing flow path 302. As described above, the emulated processing flow path 302 is indicative of the manner in which the backup data sets 208 flow through the processing flow path of the backup storage system 202 when the backup storage system 202 stores the backup data sets. At step 908, the emulating backup storage system 210 calculates one or more timing statistics based on the flow of the backup set metadata 204 through the emulated processing flow path 302. As described in further detail below, the timing statistics can include, for example, the timing of how the backup set metadata entries of the backup data sets flow (or are processed) through the emulated processing flow path 302 and/or whether the time (and resources) consumed by a process for a backup set metadata entry with certain characteristics warrants skipping the execution of the process for the particular backup data set represented by the backup set metadata entry.

Referring to step 908, the emulating backup storage system 210 can store, for each backup set metadata entry from the backup set metadata, data indicative of a time when the backup set metadata entry reached each processing state of the two or more potential processing states (e.g., in the backup storage media 216 or a separate storage device). For example, the emulating backup storage system 210 can store the timestamp of when each backup set metadata entry reaches each processing state. The emulating backup storage system 210 can calculate various timing statistics for the backup data sets based on the stored timestamp data. For example, the emulating backup storage system 210 can calculate, for each backup set metadata entry from the backup set metadata 320, a process flow timing statistic indicative of an amount of time the backup set metadata entry took to reach each processing state (e.g., from the previous processing state, from the emulating backup storage system 210 initial receipt of the backup data set, etc.). For example, the emulating backup storage system 210 can determine that it took one day for a backup set metadata entry to reach state 100, two days for the backup set metadata entry to reach state 200, etc.

In some embodiments, the emulating backup storage system 210 calculates the process flow timing statistic for each processing state based on the stored timestamp data to generate historical data for the backup set metadata. For example, the historical data can indicate how long it took the emulating backup storage system 210 to process each backup set metadata entry to completion, how long a processing state took to process a backup set metadata entry, how long a software agent 404 took to process backup set metadata entries, and other historical data.

In some embodiments, the process flow timing statistics can be used to calculate faults during execution of the emulating backup storage system 210. For example, the emulating backup storage system 210 can determining process flow timing statistics for the processing states in the emulated processing flow path 302. The emulating backup storage system 210 can determine, based on predetermined thresholds, that the process flow timing statistics are indicative of a fault. For example, the process flow timing statistics may indicate that a processing state is taking too long to process backup set metadata entries. In some examples, the processing state may have various software agents 404 that the emulating backup storage system 210 executes for different backup set metadata entries (e.g., based on data type). The emulating backup storage system 210 can identify a software agent 404 that is operating on the backup set metadata entries of the backup set metadata that are associated with the process flow timing statistics indicative of a fault. The emulating backup storage system 210 can generate a fault for the individual software agent or the processing state as a whole.

Advantageously, the timing statistics can be used to identify performance issues in the emulated processing data flow 302. For example, the emulating backup storage system 210 can use the historical data to view a snapshot of the timing information for the emulated processing data flow (e.g., to determine how long the backup sets take to pass from processing state to processing state, or through the entire emulated processing data flow 302). The emulating backup storage system 210 can use the timing data to identify software agents that need to be improved. Advantageously, not only can the emulating backup storage system 210 identify a problem with the processes as a whole, but it can also point to a specific aspect of the process that is failing.

Figure 10:
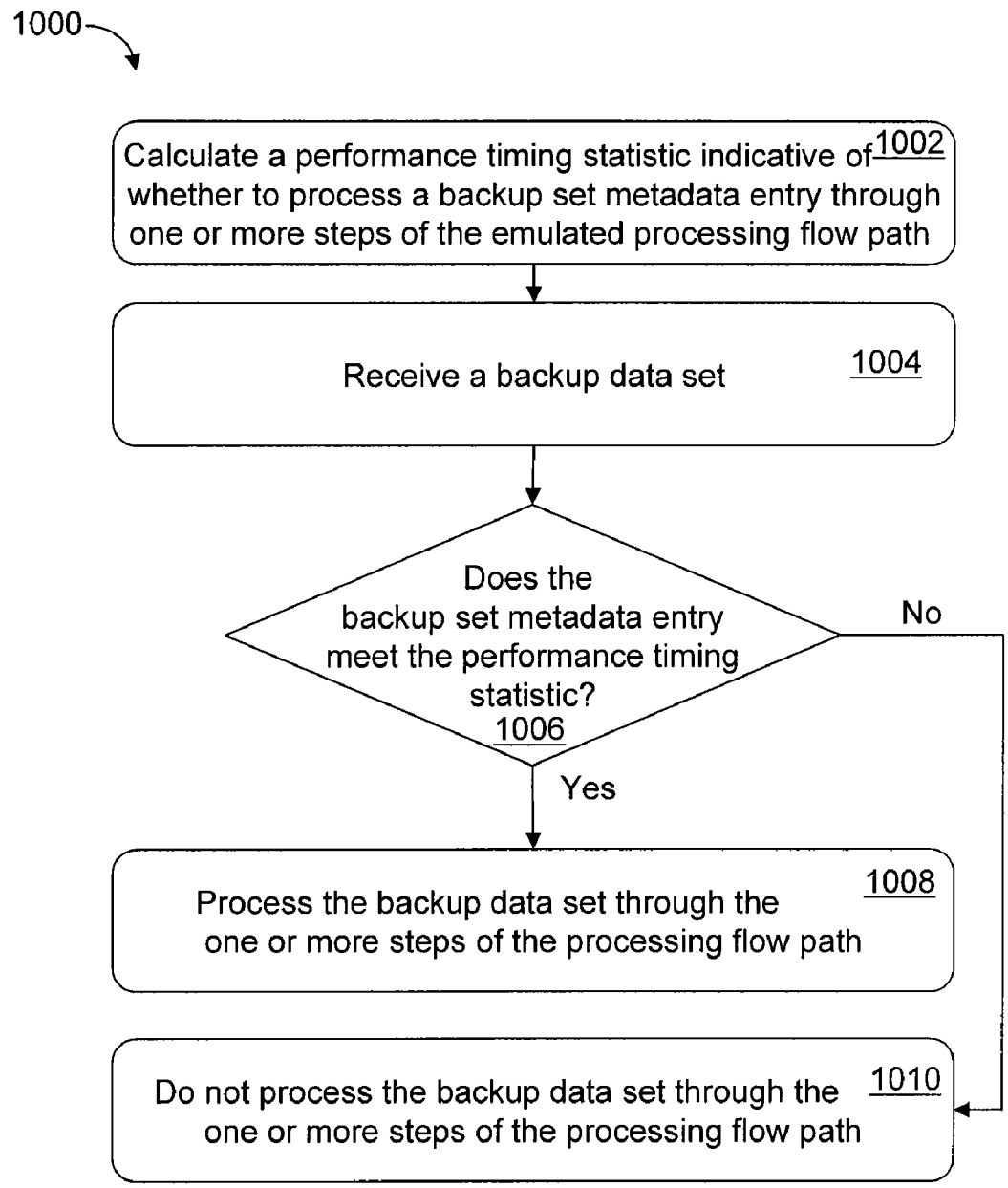
FIG. 10 is an exemplary method for calculating process flow timing statistics according to the present invention.

FIG. 10 is an exemplary method 1000 for calculating performance timing statistics according to the present invention. Referring to FIG. 3, at step 1002 the emulating backup storage system 210 calculates a performance timing statistic for the backup set metadata 320 indicative of whether to process a backup set metadata entry through one or more processing states (or steps) of the emulated processing flow path 302 (and therefore whether the backup storage system 202 should process the backup data set represented by the metadata entry). At step 1004, the backup storage system 202 receives a backup data set. At step 1006, the backup storage system 202 determines whether or not the backup data set meets the performance timing statistic. If the backup data set meets the performance timing statistic, then the method proceeds to step 1008 and the backup storage system 202 processes the backup data set through the one or more steps of the emulated processing flow path 302 that are associated with the timing statistic. If the backup data set does not meet the performance timing statistic, then the method proceeds to step 1010 and the backup storage system 202 does not process the backup data set through the one or more steps of its processing flow path.

Referring to step 1002, the performance timing statistic can be used to determine whether it is worth it from a system resources standpoint for the backup storage system 202 to process a particular backup data set through a processing state. The emulating backup storage system 202 can calculate the performance timing statistic based on historical data captured while the emulating backup storage system 210 processes the backup set metadata. For example, the historical data can include size information in the backup set metadata (e.g., the average size of all of the backup data sets represented by the backup set metadata), a count of the backup set metadata entries in the backup set metadata (e.g., how many backup set metadata entries the backup storage system 202 processed, how many backup set metadata entries have a particular data size), and/or a performance metric associated with processing the backup set metadata through the one or more steps of the emulated processing flow path 302 (e.g., how well a particular processing state processes data based on the represented backup data set size).

In some embodiments, the emulating backup storage system 210 calculates a performance timing statistic indicative of a minimum required size for a backup data set to process the backup data set through a processing state. Therefore, the emulating backup storage system 210 uses the performance timing statistic to indicate that one or more groups of data should not be processed through a processing state of the program (e.g., one data set is too small). For example, the minimum size ensures that processing the backup data set through a processing step of the processing flow path of the backup storage system 202 is computationally efficient. Similarly, for example, the minimum size can ensure that if processing the backup data set would not result in a desired functionality of the processing state, then the processing state can be skipped (for example, if the processing state deduplicates data stored on the backup storage system but the backup data set is too small to achieve much (if at all) data deduplication, then the data set is skipped). The historical data, as described above, can be used to determine which attributes of a backup data set should be monitored to determine whether or not the backup storage system 202 processes the backup data set.

In some examples, the performance timing statistic is based on an adaptive determination performed on the live backup storage system 202. For example, the performance timing statistic can be calculated based on metrics gleaned from how the live backup storage system 202 processes backup data sets. Advantageously, the backup storage system 202 can recalculate the performance timing statistic as needed to properly tailor the statistic to the data the backup storage system 202 is processing.

As an example, assume the performance of the deduplication process of the backup storage system 202 is directly related to the size of the backup data set. The emulating backup storage system 210 can process the historical data to determine a data size that is an appropriate minimum size for deduplication. For example, the emulating backup storage system 210 may determine that 80-90% of the data being backed up by the backup storage system 202 are in large size backup data sets (10 GB, 100 GB, etc.), and therefore only represent a small number of backup data sets (e.g., 50 large backup data sets contain 80-90% of the data). The remaining percentage of data is in many small backup data sets (e.g., the remaining 10% of the data is in 1,000 small backup data sets). Advantageously, the emulating backup storage system 210 can determine an appropriate ratio such that only a small percentage of the backup data is skipped by the backup storage system 202 for deduplication while resulting in a large percentage of backup data sets being omitted from deduplication. For example, if the backup storage system 202 omits processing 0.1% of the data, the omission will have little to no impact on the backup storage system 202 performance, but will cut out 80% of the deduplication jobs. Advantageously, omitting deduplication for only a small percentage of the data can result in a large increase in performance.

In some embodiments, as described above, customers can configure aspects of the backup storage system 202. Therefore, the performance timing statistic can be calculated on a per-customer basis, based on their backup data configurations. For example, some customers may configure the size of their backup data sets between 1-5 GB, while other customers use 100 G or more for their backup data sets. Therefore, the performance timing statistic for each customer may be unique.

In some embodiments, the emulating backup storage system 210 can calculate a default performance timing statistic (e.g., that can be initially used for new customers based on historical data across many different customers). The emulating backup storage system 210 can monitor the flow of the backup set metadata 320 through the emulated processing flow path 302 using the default performance timing statistic. The emulating backup storage system 210 can recalculate the default performance timing statistic based on the monitored flow of the backup data sets. The emulating backup storage system 210 can reset the default performance metric of the backup storage system based on the recalculated performance timing statistic (e.g., reset the value to the recalculated performance metric).

In some embodiments, the emulating backup storage system 210 can further adjust the performance timing statistic based on system factors. For example, if the system performance is OK, then the backup storage system 202 can still process the backup data sets even if the backup data sets do not meet the performance timing statistic because there is no system impact for performing the additional processing.

In some embodiments, historical data (e.g., historical data of the software agents running on the emulating backup storage system 210) can be analyzed over time to automatically identify trends with how the backup storage system 202 is processing the backup data sets 208. For example, the emulating backup storage system 210 can analyze the historical data to determine whether the backup storage system 202 is keeping up on a daily (or weekly, monthly, etc.) basis with the backup data sets 208. For example, the emulating backup storage system 210 can determine the processing flow path of the backup storage system 202 is getting further and further behind with processing the data. In some examples, the emulating backup storage system 210 can analyze the historical data to determine that a certain number of jobs are always being executed by a specific software agent. For example, the emulating backup storage system 210 can determine that there are always 20 jobs being executed by a particular software agent, regardless of how much data is being input into the backup storage system 202.

In some examples, the emulating backup storage system 210 determines whether the performance of a specific software agent is degrading or improving over time (e.g., after an upgrade to a new release). For example, the emulating backup storage system 210 can calculate the average amount of time it takes for an agent to complete computation over time, and use the slope of the data to determine whether the average amount of time is increasing or decreasing (e.g., whether the slope is increasing or decreasing). In some examples, the emulating backup storage system 210 calculates whether one or more software agents are logging excessive errors (e.g., based on the agent log files from the backup storage system 202).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, I-ID-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier interne protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for system monitoring comprising:

receiving, by a emulating computing device, backup set metadata, wherein the backup set metadata comprises information about backup data sets that are received by a backup storage system that stores the backup data sets; and emulating, by the software monitor computing device, the manner in which the backup data sets flow through a processing flow path of the backup storage system comprising:

executing, by the emulating computing device, one or more processes that process the backup set metadata through an emulated processing flow path, wherein the emulated processing flow path is indicative of the manner in which the backup data sets flow through the processing flow path of the backup storage system when the backup storage system stores the backup data sets; and calculating, by the emulating computing device, one or more timing statistics based on the flow of the backup set metadata through the emulated processing flow path.

2. The method of claim 1 further comprising:

determining two or more potential processing states within the emulated processing flow path; and calculating, for each backup set metadata entry of the backup set metadata that is indicative of a backup data set, a process flow timing statistic indicative of an amount of time the backup set metadata entry took to reach a processing state of the two or more potential processing states within the emulated processing flow path.

3. The method of claim 2 further comprising:

storing, for the backup set metadata entry, data indicative of a time when the backup set metadata entry reached each processing state of the two or more potential processing states; and calculating the timing statistic based on the stored data.

4. The method of claim 3 further comprising calculating, for each backup set metadata entry from the backup set metadata, a process flow timing statistic for each processing state of the two or more potential processing states based on the stored data to generate historical data for the backup set metadata entry.

5. The method of claim 2 further comprising:

determining process flow timing statistics for a processing state of the two or more potential processing states are above a predetermined threshold;

identifying a software agent operating on the backup set metadata entries of the backup set metadata associated with the process flow timing statistics at the processing state; and generating a fault with the software agent.

6. The method of claim 1 further comprising calculating a performance timing statistic for the backup set metadata indicative of whether to process a backup data set through one or more steps of the processing flow path in the backup storage system.

7. The method of claim 6 further comprising calculating the performance timing statistic based on how backup data sets are processed by the backup storage system.

8. The method of claim 6 further comprising calculating the performance timing statistic based on size information in the backup set metadata, a count of the backup set metadata entries in the backup set metadata, and a performance metric associated with processing the backup set metadata through the one or more steps of the emulated processing flow path.

9. The method of claim 6 further comprising calculating a performance timing statistic indicative of a minimum required size for a backup data set to make processing the backup data set through a deduplication step of the processing flow path at least one of (i) computationally efficient or (ii) efficient to reduce a storage size of the backup data set by the backup storage system.

10. The method of claim 6 further comprising:

calculating a default performance timing statistic;

monitoring the flow of the backup set metadata through the emulated processing flow path using the default performance timing statistic; and recalculating the default performance timing statistic based on the monitored flow of the backup set metadata.

11. The method of claim 10 further comprising calculating the default performance timing statistic based on one or more user configured settings of the backup storage system.

12. The method of claim 10 further comprising setting a default performance metric of the backup storage system based on the recalculated performance timing statistic.

13. An apparatus for system monitoring, the apparatus comprising a computing device with a processor and memory configured to:

receive backup set metadata, wherein the backup set metadata comprises information about backup data sets that are received by a backup storage system that stores the backup data sets; and emulate the manner in which the backup data sets flow through a processing flow path of the backup storage system comprising:

execute one or more processes that process the backup set metadata through an emulated processing flow path, wherein the emulated processing flow path is indicative of the manner in which the backup data sets flow through the processing flow path of the backup storage system when the backup storage system stores the backup data sets; and calculate one or more timing statistics based on the flow of the backup set metadata through the emulated processing flow path.

14. The apparatus of claim 13 wherein the computing device is further configured to:

determine two or more potential processing states within the emulated processing flow path; and calculate, for each backup set metadata entry of the backup set metadata that is indicative of a backup data set, a process flow timing statistic indicative of an amount of time the backup set metadata entry took to reach a processing state of the two or more potential processing states within the emulated processing flow path.

15. The apparatus of claim 14 wherein the computing device is further configured to:

store, for the backup set metadata entry, data indicative of a time when the backup set metadata entry reached each processing state of the two or more potential processing states; and calculate the timing statistic based on the stored data.

16. The apparatus of claim 14 wherein the computing device is further configured to:

determine process flow timing statistics for a processing state of the two or more potential processing states are above a predetermined threshold;

identify a software agent operating on the backup set metadata entries of the backup set metadata associated with the process flow timing statistics at the processing state to determine; and generate a fault with the software agent.

17. The apparatus of claim 13 wherein the computing device is further configured to calculate a performance timing statistic for the backup set metadata indicative of whether to process a backup data set through one or more steps of the processing flow path in the backup storage system.

18. The apparatus of claim 17 wherein the computing device is further configured to:
calculate a default performance timing statistic;
monitor the flow of the backup set metadata through the emulated processing flow path using the default performance timing statistic; and
recalculate the default performance timing statistic based on the monitored flow of the backup set metadata.

19. The apparatus of claim 13 wherein a fault is indicative of a fault with a user configuration of a backup application.

20. A computer program product, tangibly embodied in a non-transitory computer readable medium, the computer program product including instructions being operable to cause a data processing apparatus to:
receive backup set metadata, wherein the backup set metadata comprises information about backup data sets that are received by a backup storage system that stores the backup data sets; and
emulate the manner in which the backup data sets flow through a processing flow path of the backup storage system comprising:
execute one or more processes that process the backup set metadata through an emulated processing flow path, wherein the emulated processing flow path is indicative of the manner in which the backup data sets flow through the processing flow path of the backup storage system when the backup storage system stores the backup data sets; and
calculate one or more timing statistics based on the flow of the backup set metadata through the emulated processing flow path.

* * * * *